United States Patent
Covington et al.

(10) Patent No.: US 7,715,154 B2
(45) Date of Patent: May 11, 2010

(54) SUPPRESSION OF SPIN MOMENTUM TRANSFER AND RELATED TORQUES IN MAGNETORESISTIVE ELEMENTS

(75) Inventors: Mark William Covington, Pittsburgh, PA (US); Nils Jan Gokemeijer, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 1428 days.

(21) Appl. No.: 11/105,133

(22) Filed: Apr. 13, 2005

(65) Prior Publication Data

US 2006/0232892 A1    Oct. 19, 2006

(51) Int. Cl.
*G11B 5/33* (2006.01)
(52) U.S. Cl. .................................. 360/324.12
(58) Field of Classification Search ........................ None
See application file for complete search history.

(56) References Cited

U.S. PATENT DOCUMENTS

| | | | |
|---|---|---|---|
| 5,287,238 A | | 2/1994 | Baumgart et al. |
| 5,576,914 A | | 11/1996 | Rottmayer et al. |
| 5,695,864 A | * | 12/1997 | Slonczewski ............... 428/212 |
| 5,883,763 A | | 3/1999 | Yuan et al. |
| 6,259,586 B1 | * | 7/2001 | Gill .......................... 360/324.2 |
| 6,272,036 B1 | | 8/2001 | You et al. |
| 6,556,388 B1 | | 4/2003 | Everitt et al. |
| 6,563,679 B1 | | 5/2003 | Li et al. |
| 6,621,664 B1 | | 9/2003 | Trindade et al. |
| 6,798,623 B2 | | 9/2004 | Seigler et al. |
| 6,980,469 B2 | * | 12/2005 | Kent et al. .................. 365/171 |
| 2003/0206380 A1 | * | 11/2003 | Seigler et al. ............... 360/324 |
| 2004/0008450 A1 | | 1/2004 | Gill |
| 2004/0061981 A1 | | 4/2004 | Covington |
| 2004/0109264 A1 | | 6/2004 | Gill |
| 2005/0007707 A1 | | 1/2005 | Gill |
| 2008/0112094 A1 | * | 5/2008 | Kent et al. ............. 360/324.11 |

OTHER PUBLICATIONS

J. Z. Sun et al., "Batch-Fabricated Spin-Injection Magnetic Switches," *Applied Physics Letters*, vol. 81, No. 12, Sep. 16, 2002, pp. 2202-2204.

* cited by examiner

*Primary Examiner*—David D Davis
(74) *Attorney, Agent, or Firm*—Robert P. Lenart, Esq.; Pietragallo Gordon Alfano Bosick & Raspanti, LLP (57) ABSTRACT

An apparatus comprises a ferromagnetic free layer having a first magnetic moment and having a magnetization that rotates in response to an external magnetic field, a first ferromagnetic reference layer positioned adjacent to a first side of the ferromagnetic free layer and having a second magnetic moment that is greater than the first magnetic moment of the ferromagnetic free layer, a second ferromagnetic reference layer positioned adjacent to a second side of the ferromagnetic free layer and having a third magnetic moment that is greater than the first magnetic moment of the ferromagnetic free layer, a first non-magnetic spacer layer positioned between the ferromagnetic free layer and the first ferromagnetic reference layer, a second non-magnetic spacer layer positioned between the ferromagnetic free layer and the second ferromagnetic reference layer, and a source of magnetic field for biasing the first and second ferromagnetic reference layers.

20 Claims, 6 Drawing Sheets

SUPPRESSION OF SPIN MOMENTUM TRANSFER AND RELATED TORQUES IN MAGNETORESISTIVE ELEMENTS

FIELD OF THE INVENTION

The invention relates to magnetoresistive elements and, more particularly, to the suppression of spin momentum transfer and related torques in magnetoresistive elements.

BACKGROUND OF THE INVENTION

Devices utilizing the giant magnetoresistance (GMR) effect have utility as magnetic sensors, especially as read sensors in recording heads used in magnetic disc storage systems. The GMR effect is observed in thin, electrically conductive multi-layer systems having multiple magnetic layers. One sensor type that utilizes the GMR effect is the GMR multi-layer. The GMR multi-layer typically comprises a series of bi-layers, each of which includes a thin sheet of a ferromagnetic material and a thin sheet of a non-magnetic material. The bi-layers are stacked to form a multi-layer device. The multi-layer device is usually mounted in the read head so that the layers are perpendicular to the plane of the disc.

In operation, a sense current is caused to flow through the read head and therefore through the sensor. Magnetic flux from the disc causes a rotation of the magnetization vector in at least one of the layers, which in turn causes a change in the overall resistance of the sensor. As the resistance of the sensor changes, the voltage across the sensor changes, thereby producing an output voltage.

The output voltage produced by the sensor is affected by various characteristics of the sensor. The sense current can flow through the sensor in a direction that is parallel to the planes of the layers or stacked strips. This is known as a current-in-plane or CIP configuration. Alternatively, the sense current can flow through the sensor in a direction that is perpendicular to the planes of the layers or stacked strips that comprise the sensor. This configuration is known as a current-perpendicular-to-plane or CPP configuration.

The CPP sensor is interesting because of its potentially larger giant magnetoresistance (GMR) or change in resistance when a magnetic field is applied. The CPP sensor is therefore capable of producing a higher output voltage than the CIP sensor, which results in a more precise and sensitive read head. The larger change in resistance comes about because all of the current needs to pass through every ferromagnetic/non-magnetic/ferromagnetic (FM/NM/FM) series of interfaces. Because every film and interface leads to additional resistance, it is desirable to have all of the layers and interfaces contribute to the overall change in resistance $\Delta R$ of the device.

GMR devices having the described CPP configuration have the potential to be used as read back sensors in data storage systems operating at areal densities on the order of about 1 Tbit/in$^2$. CPP GMR devices offer the prospect of relatively large magnetoresistance ratios, $\Delta R/R$. However, it has been observed that CPP read back sensors produce a significant amount of noise that limits the practical application of CPP GMR devices in recording heads. It has been determined that a major source of this noise results from a phenomenon called spin momentum transfer, which generally refers to the exchange of spin angular momentum between conduction electrons and the magnetic moment of a ferromagnet. This spin momentum transfer effect leads to torques that act on the ferromagnetic layers within a CPP device, consequently leading to unintended magnetization dynamics or noise. This effect will occur between any two adjacent ferromagnetic layers such that every layer within a CPP GMR multi-layer device will fluctuate and contribute to device noise. Therefore, CPP devices that fail to account for spin momentum transfer will inevitably be noisy.

Accordingly, there is a need for an improved CPP configuration that overcomes the limitations, disadvantages, or shortcomings of known CPP configurations.

SUMMARY OF THE INVENTION

The invention provides an apparatus comprising a ferromagnetic free layer having a first magnetic moment and a magnetization that rotates in response to an external magnetic field, a first ferromagnetic reference layer positioned adjacent to a first side of the ferromagnetic free layer and having a second magnetic moment that is greater than the first magnetic moment of the ferromagnetic free layer, a second ferromagnetic reference layer positioned adjacent to a second side of the ferromagnetic free layer and having a third magnetic moment that is greater than the first magnetic moment of the ferromagnetic free layer, a first non-magnetic spacer layer positioned between the ferromagnetic free layer and the first ferromagnetic reference layer, a second non-magnetic spacer layer positioned between the ferromagnetic free layer and the second ferromagnetic reference layer, and a source of magnetic field for biasing the first and second ferromagnetic reference layers.

In another aspect the invention provides a magnetoresistive element having reduced spin momentum transfer induced noise. The magnetoresistive element includes a ferromagnetic free layer having a first magnetic moment and a magnetization that rotates in response to an external magnetic field, a first ferromagnetic reference layer positioned adjacent to a first side of the ferromagnetic free layer and having a second magnetic moment that is greater than the first magnetic moment of the ferromagnetic free layer, a second ferromagnetic reference layer positioned adjacent to a second side of the ferromagnetic free layer and having a third magnetic moment that is greater than the first magnetic moment of the ferromagnetic free layer, a first non-magnetic spacer layer positioned between the ferromagnetic free layer and the first ferromagnetic reference layer, a second non-magnetic spacer layer positioned between the ferromagnetic free layer and the second ferromagnetic reference layer, and a source of magnetic field for biasing the first and second ferromagnetic reference layers.

The invention also encompasses a data storage system comprising a storage media and a recording device positioned adjacent to the storage media wherein the recording device includes a read element. The read element includes a ferromagnetic free layer having a first magnetic moment and a magnetization that rotates in response to an external magnetic field, a first ferromagnetic reference layer positioned adjacent to a first side of the ferromagnetic free layer and having a second magnetic moment that is greater than the first magnetic moment of the ferromagnetic free layer, a second ferromagnetic reference layer positioned adjacent to a second side of the ferromagnetic free layer and having a third magnetic moment that is greater than the first magnetic moment of the ferromagnetic free layer, a first non-magnetic spacer layer positioned between the ferromagnetic free layer and the first ferromagnetic reference layer, a second non-magnetic spacer layer positioned between the ferromagnetic free layer and the second ferromagnetic reference layer, and a source of magnetic field for biasing the first and second ferromagnetic reference layers.

DETAILED DESCRIPTION OF THE INVENTION

Figure 1:
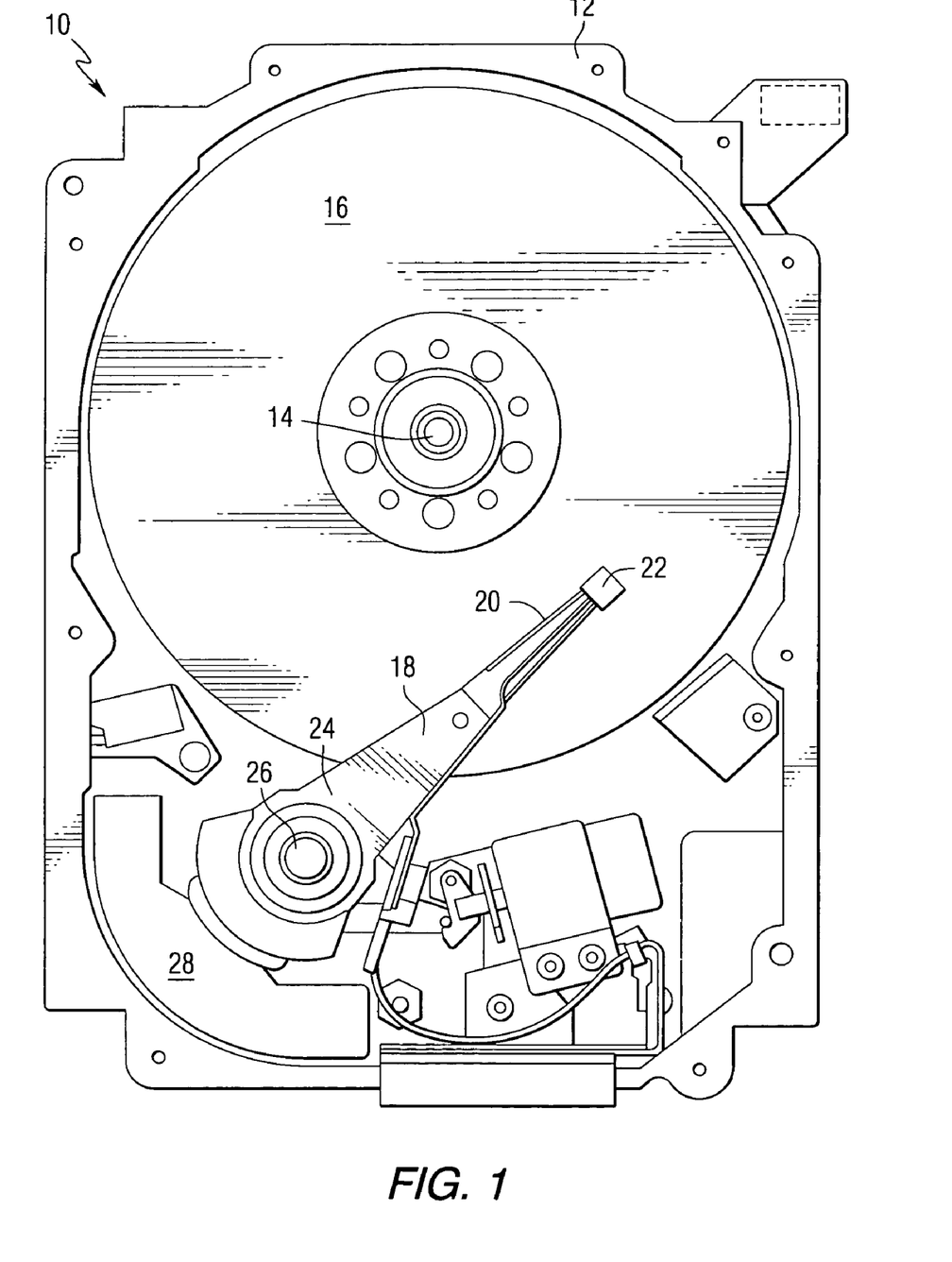
FIG. 1 is a pictorial representation of a disc drive.

Referring to the drawings, FIG. 1 is a pictorial representation of a disc drive 10 that can utilize magnetic recording heads, or other type recording heads such as magneto-optical or thermal/heat assisted recording heads constructed in accordance with this invention. The disc drive includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 to position the head 22 over a desired sector of the disc 16. The actuator motor 28 is regulated by a controller that is not shown in this view and is well-known in the art.

Figure 2:
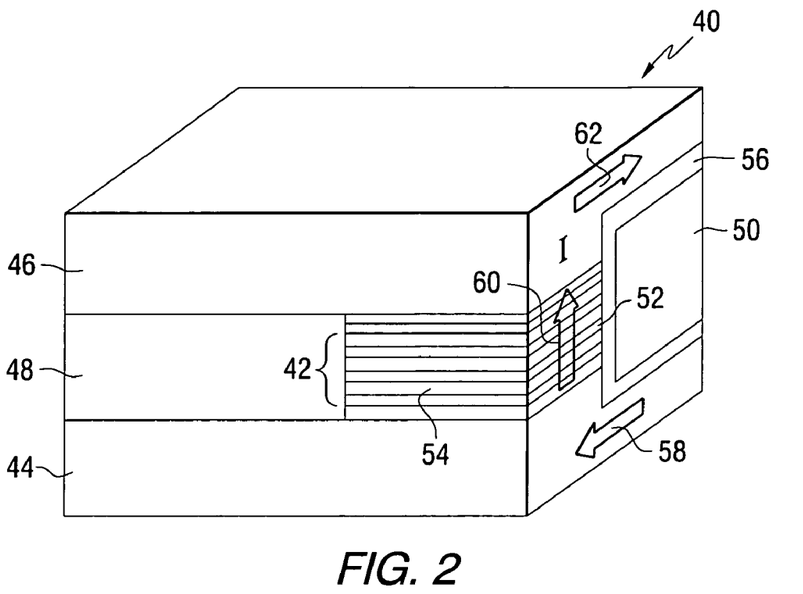
FIG. 2 is an isometric view of a CPP reader constructed in accordance with the invention.

FIG. 2 is a schematic representation of a shielded CPP multi-layer read sensor 40. The sensor includes a CPP multi-layer 42 electrically connected between first and second electrically conductive shields 44 and 46. Insulation 48 is provided between the shields behind the multi-layer stack. A permanent magnet 50 is positioned between the shields and adjacent to a first side 52 of the CPP stack that is opposite the air bearing surface side 54 of the CPP stack. Insulation 56 is provided around the permanent magnet. In operation, a current I flows through the shields and the CPP stack as illustrated by arrows 58, 60 and 62. This current creates a voltage across the CPP stack. A change in resistance of the CPP stack causes a change in the voltage across the stack.

Figure 3:
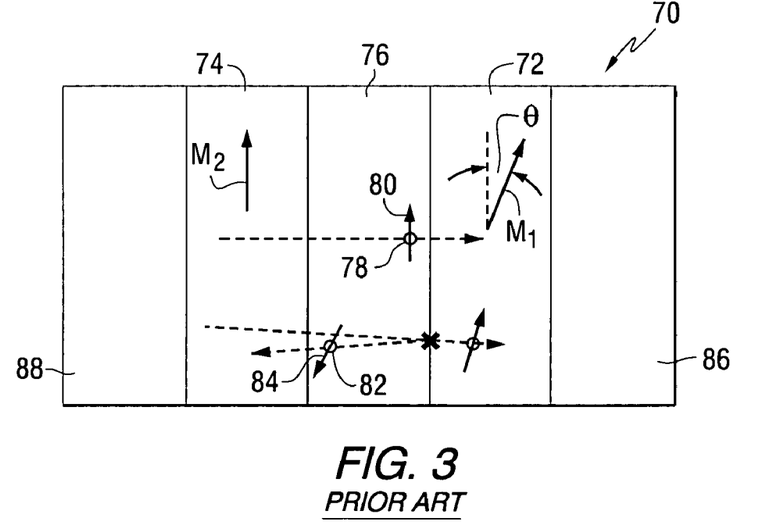
FIG. 3 is a side view of a CPP stack.

FIG. 3 is a side view of a known CPP stack 70 that is provided to illustrate the spin transfer torques acting on two adjacent ferromagnetic layers within a GMR multi-layer. The CPP stack includes first and second magnetic layers 72 and 74, having magnetizations $M_1$ and $M_2$ respectively, and being positioned on opposite sides of a non-magnetic spacer layer 76. Electrical contacts 86 and 88 are used to supply electrical current to the stack. Electrons illustrated as item 78, that include a magnetic moment 80 that is parallel to $M_2$ and pass from layer 74 to layer 72, will exert a torque $\tau_1$ on $M_1$ of:

$$\tau_1 = \gamma a_j (\overline{M_1} \times (\overline{M_1} \times \overline{M_2})),$$

where $\gamma$ is the gyromagnetic ratio and is defined as $\gamma = g\mu_B/\hbar$, g is the Landé g-factor (typically g≈2), $\mu_B$ is the Bohr magneton, $\hbar$ is Planck's constant, and $a_j$ is a coefficient that parameterizes the strength and direction of the spin torque and is proportional to the electrical current, I. Hence, $a_j$ depends upon both the amplitude and sign of I. For the particular example shown in FIG. 3, $a_j$<0.

Electrons illustrated as item 82, that back-scatter off of layer 72 and travel to layer 74 with a magnetic moment 84 that is anti-parallel to $M_1$, will exert a torque $\tau_2$ on $M_2$ of:

$$\tau_2 = \gamma a_j (\overline{M_2} \times (\overline{M_1} \times \overline{M_2})).$$

In the stack of FIG. 3, an electron current moving from left to right is polarized by layer 74, which then exerts a spin torque on layer 72 that favors parallel alignment between the two layers. At the same time, the strong interfacial scattering of minority electrons at the interface of layer 72 leads to a polarized electron current acting on layer 74 that favors anti-parallel alignment between the two layers. These processes will occur between any two adjacent ferromagnetic layers such that every layer within a CPP GMR multi-layer reader will fluctuate and contribute to device noise. The practical result is that CPP reader designs that fail to account for spin transfer will inevitably be noisy. There is a clear need to develop read sensors that can circumvent this problem.

Figure 4:
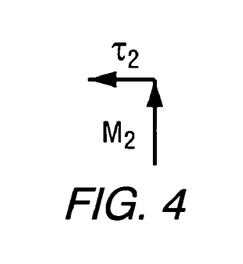
FIGS. 4 and 5 are schematic diagrams that illustrate magnetization and torque in the CPP stack of FIG. 3.
Figure 5:
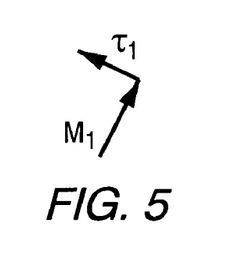

FIGS. 4 and 5 are diagrams showing the directions of the spin torques acting on the magnetizations of layers 74 and 72, respectively, for the situation shown in FIG. 3. Layer 74 exerts a spin torque on layer 72 and vice versa.

Figure 6:
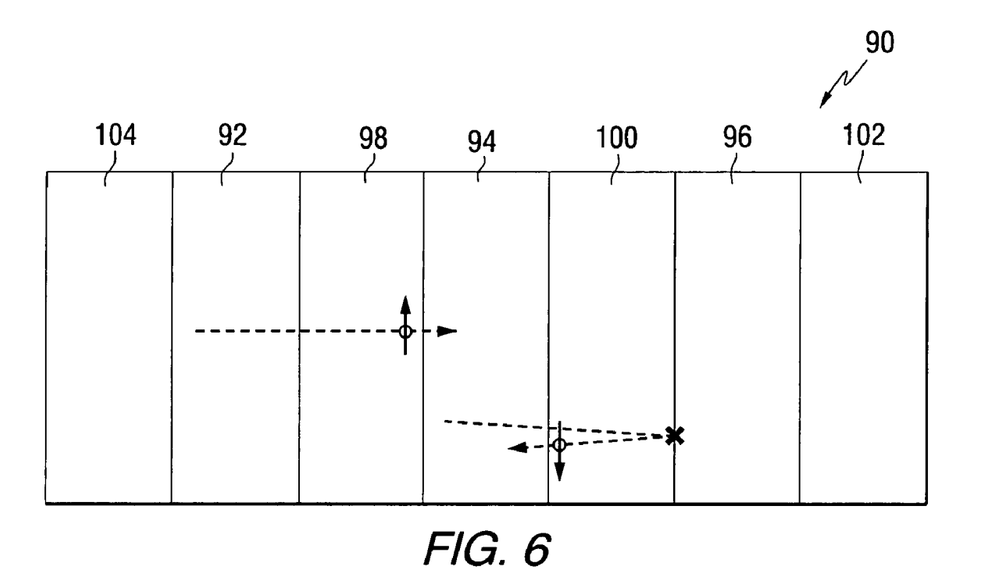
FIG. 6 is a side view of an alternative CPP stack.

The microscopic interactions that lead to spin torque are inherent to CPP GMR devices and therefore cannot be eliminated. However, it is possible to design read sensors in such a way as to cancel out the spin torque acting on the free ferromagnetic layers of the device. The basic CPP stack element 90 of the sensor of this invention is shown in FIG. 6. It includes three ferromagnetic layers 92, 94 and 96 that have non-magnetic spacers 98 and 100 between them. Electrical contacts 102 and 104 are used to supply electrical current to the stack. The choice of materials should be such that the structure exhibits a large magnetoresistance so that it will be useful as a read sensor. One free magnetic layer 94 in FIG. 6 responds to the stray fields from an adjacent magnetic storage media. On either side of this free layer are pinned magnetic layers 92 and 96. The pinned layer magnetizations $M_{P1}$, and $M_{P2}$ are aligned parallel to each other and along the same direction and are also very stiff so that they do not rotate in the presence of media fields and spin transfer torques. The spin torques from the pinned layers that act on the free layer magnetization $M_F$ are opposite to each other, leading to a net cancellation of spin torque.

FIG. 6 illustrates the fundamental concept of the invention. Two pinned magnetic layers have their magnetizations aligned along the same direction. These pinned layers are placed on either side of a free magnetic layer and are separated from the free layer by non-magnetic metallic spacer layers. Electrons traveling from the first pinned layer to the free layer that have a magnetic moment parallel to the magnetization of the first pinned layer exert a spin torque $(\tau_F)_1$ on the free layer of:

$$(\tau_F)_1 = \gamma a_j (\vec{M_F} \times (\vec{M_F} \times \vec{M_{P1}})).$$

Electrons that back-scatter off of the second pinned layer and travel to the free layer with a magnetic moment antiparallel to the magnetization of the second pinned layer will exert a spin torque $(\tau_F)_2$ on the free layer of:

$$(\tau_F)_2 = \gamma a_j (\vec{M_F} \times (\vec{M_{P2}} \times \vec{M_F})).$$

Figure 7:
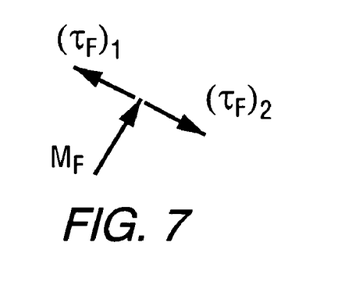
FIG. 7 is a schematic diagram that illustrates magnetization and torque in the CPP stack of FIG. 6.

FIG. 7 is a diagram showing how the spin torques $(\tau_F)_1$ and $(\tau_F)_2$ exerted on the free layer by the pinned layers are opposite and thus cancel each other out.

The simplest conceptual implementation of the proposed solution is a dual spin valve. Dual spin valves have been previously described for use in both current-in-plane (CIP) and CPP readers. However, there are technical issues centered around the pinned layers that make it difficult to implement such devices as a 1 Tbit/in² reader. In order to fix the orientations of the pinned layer magnetizations, the known spin valves require the incorporation of either permanent magnets (PM's) or antiferromagnets (AFM's) within the thin film multi-layer. These materials provide the large magnetic anisotropy necessary to stabilize the pinned layer magnetizations, but they typically have high electrical resistivities. Furthermore, these PM and AFM materials need to be on the order to 10 nm thick in order of produce an effective stabilization. This leads to a large, unwanted series resistance for the reader and prevents the magnetic shields from being closely spaced. Finally, the thermal stability of the PM and AFM layers will be extremely difficult to maintain as the device size shrinks down to the dimensions required of a 1 Tbit/in² reader.

In contrast, the CPP multi-layer of this invention is a more attractive reader design for several reasons. First, there are no PM or AFM layers within the CPP pillar, so the device has superior thermal stability over a dual spin valve and will be much easier to fit within a tight shield-to-shield spacing. Second, the ratio of a change in resistance to the resistance ΔR/R will be larger without the series resistance of the pinning materials required in previous spin valves. Finally, the multi-layer design easily allows more magnetic layers to be incorporated within the CPP pillar so that the amplitude of the sensed voltage can be increased.

Existing CPP multi-layer designs propose the use of a multi-layer where every magnetic layer has the same thickness. However, all of the magnetic layers respond similarly to magnetic fields and spin torques, so the whole device is noisy. This leads to a key concept of the proposed solution. The way to effectively pin certain layers within a CPP multi-layer is to make pinned layers with a larger magnetic moment, $M_s t$, than the free layers, where $M_s$ is the saturation magnetization and t is the thickness. When a bias field is applied to the multi-layer, the thick layers will be effectively pinned since they will be stiffer in the presence of the bias field. The magnitude of the bias magnetic field, which will be on the order of 1 kOe, should be sufficient to orient the thick layer magnetizations along the bias field direction and have the free layer magnetization perpendicular to this direction. This will bias the device into the linear region of its resistance versus field curve, and the free layer magnetization will be oriented parallel to the disc. The bias field can be supplied by a permanent magnet placed adjacent to a side of the stack as illustrated in FIG. 2. Alternatively, the bias field can be supplied by an electromagnet or current-carrying wires.

Figure 8:
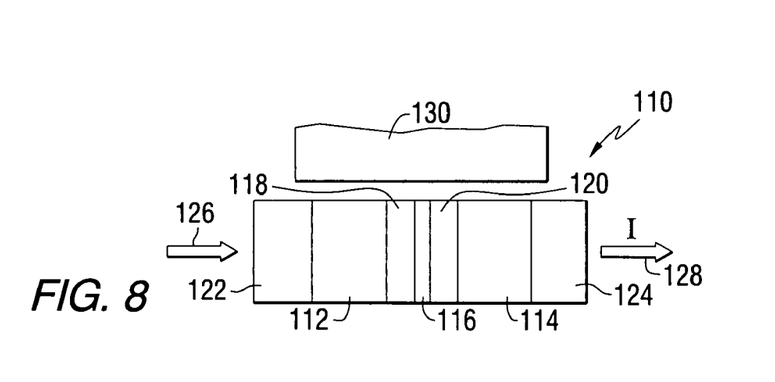
FIG. 8 is a side view of a CPP stack.

FIG. 8 is a side view of a CPP stack 110 used to illustrate the operation of the sensors of the invention. The stack includes first and second magnetic layers 112 and 114 positioned on opposite sides of a third magnetic layer 116 and separated from layer 116 by no-magnetic layers 118 and 120. The CPP stack is electrically connected between electrical conductors 122 and 124 that supply a current I to the stack as illustrated by arrows 126 and 128. Layers 122 and 124 can be non-magnetic metals, and serve to magnetically de-couple the ferromagnetic layers within the CPP device from the ferromagnetic shields (not shown in this view). The magnetic moment of layers 112 and 114 is greater than the magnetic moment of layer 116. A source of magnetic field, which can be a permanent magnet 130, is used to bias the ferromagnetic layers.

Figure 9:
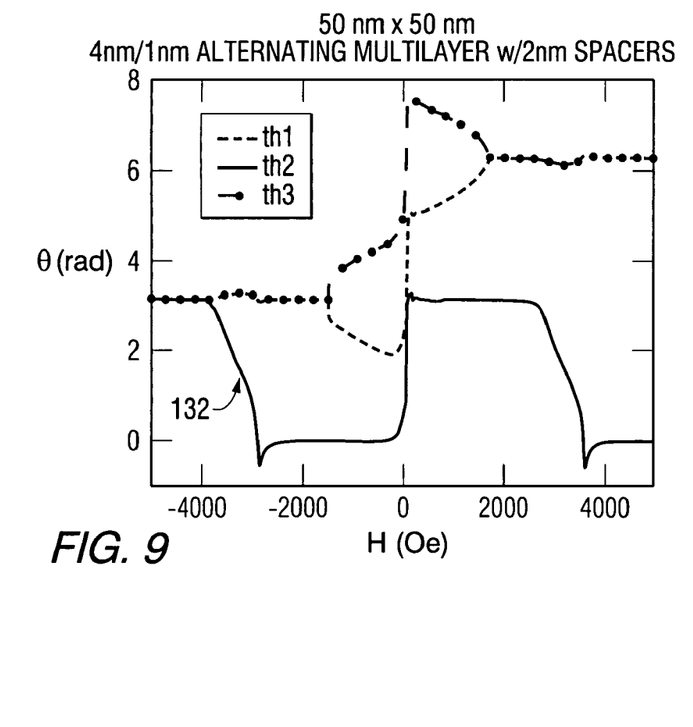
FIGS. 9 and 10 are graphs that illustrate simulated operation of the stack of FIG. 8.
Figure 10:
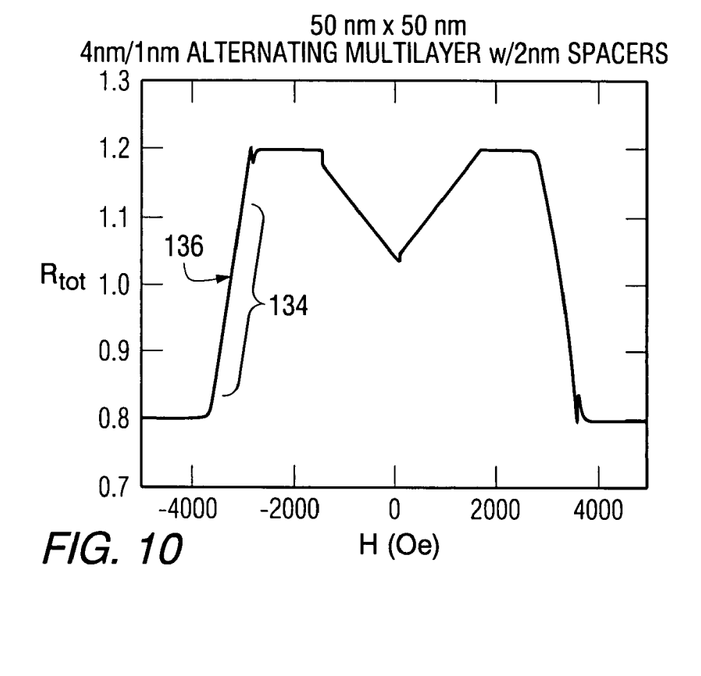

FIGS. 9 and 10 are graphs of numerical calculations of the equilibrium magnetic configurations of 50 nm×50 nm CPP structures that illustrate simulated operation of the stack of FIG. 8. The equilibrium magnetic configurations are the orientations of the magnetizations when in a static situation without any dynamic stimulus, such as thermal activation. The model assumes that every layer is comprised of the same magnetic material (CoFe in this case, with $M_s$=1440 emu/cm³) and that the magnetizations are uniform. The magnetic configuration is computed via the minimization of the free energy. The field is along 0° (180°) for positive (negative) field. The angle is an arbitrary angle used in the model. FIG. 9 plots the magnetization angles as a function of field for the different layers of the three-layer structure shown in FIG. 8. In FIG. 9, the line indicated by number 132 corresponds to the angle of the free layer magnetization. FIG. 10 shows the calculated resistance versus field, resulting from the field variation shown in FIG. 9. In FIG. 10, the operating region is indicated by item number 134, and the bias point is indicated by item number 136.

Figure 11:
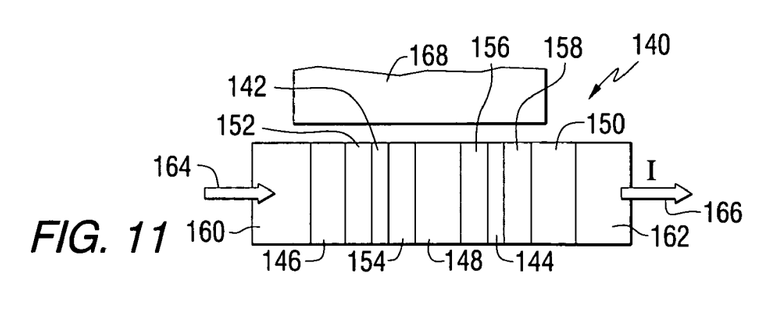
FIG. 11 is a side view of a CPP stack.

FIG. 11 is a side view of a CPP stack 140 used to illustrate the operation of the sensors of the invention. The stack includes first and second magnetic layers 142 and 144 positioned between third, fourth and fifth magnetic layers 146, 148 and 150 and separated by non-magnetic layers 152, 154, 156 and 158. The CPP stack is electrically connected between electrically conductive layers 160 and 162 that supply a current I to the stack as illustrated by arrows 164 and 166. Layers 160 and 162 can be non-magnetic metals, and serve to magnetically de-couple the ferromagnetic layers within the CPP device from the ferromagnetic shields (not shown in this view). The magnetic moment of layers 146, 148 and 150 is greater than the magnetic moments of layers 142 and 144. A source of magnetic field, which can be a permanent magnet 168, is used to bias the magnetic layers.

Figure 12:
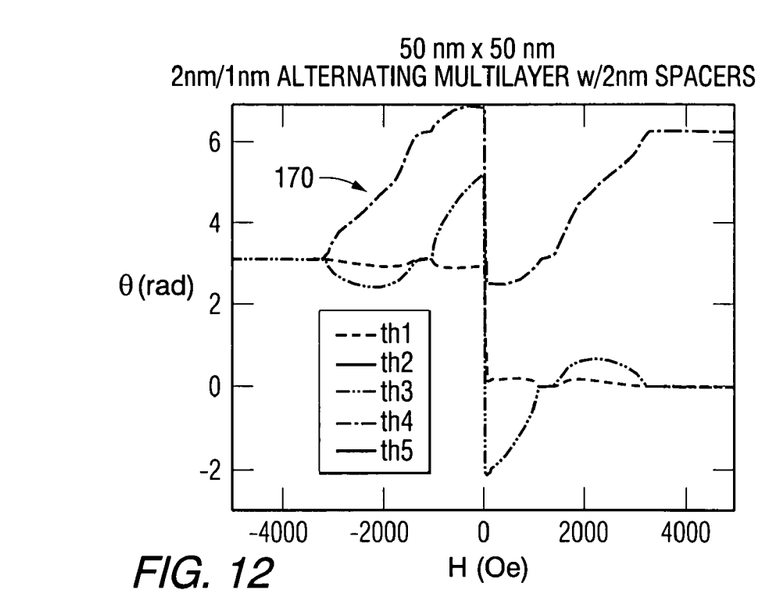
FIGS. 12 and 13 are graphs that illustrate simulated operation of the stack of FIG. 11.
Figure 13:
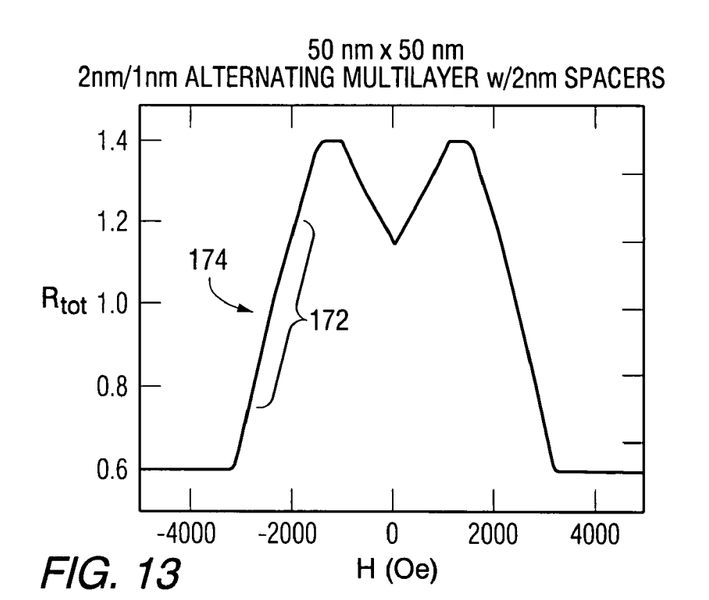

FIG. 12 is a plot of the magnetization angles as a function of field for the five-layer structure shown in FIG. 11. In FIG. 12, a region indicated by item number 170 corresponds to the free layers. FIG. 13 is a plot of resistance versus field for the data in FIG. 12. In FIG. 13, the operating region is indicated by item number 172, and the bias point is indicated by item number 174.

FIGS. 8 through 13 demonstrate the operating characteristics of two specific examples of the invention. For both the three-layer and five-layer structures, there is a range of field where only the thin, free layers rotate while the thick layers remain in a fixed orientation. The calculation shows that this leads to a very linear resistance versus field characteristic that is useful for readers. Of course, these numerical data only provide examples to show the concept is viable. The structures can be changed in order to tailor the response towards a specific application.

Figure 14:
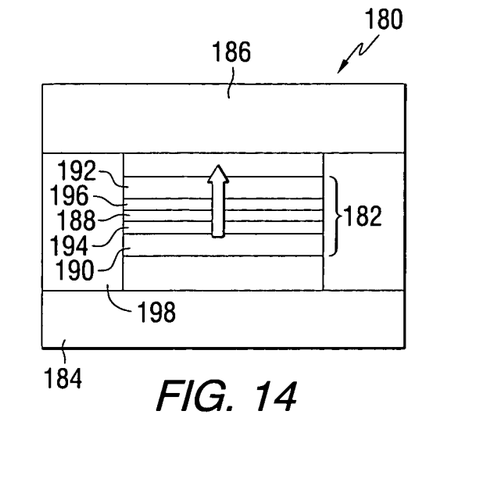
FIG. 14 is a plan view of an air bearing surface of a sensor constructed in accordance with the invention.

Additional examples of how the invention can be implemented are shown in FIGS. 14-19. FIG. 14 is a plan view of the air bearing surface (ABS) of a sensor 180. The sensor includes a CPP stack 182 electrically connected to two conductive shields 184 and 186. The CPP stack includes a magnetic free layer 188 positioned between magnetic layers 190 and 192. Each of the magnetic layers 190 and 192 has a higher magnetic moment than layer 188. Non-magnetic layers 194 and 196 separate the higher magnetic moment material from the free layer material. Insulation 198 is positioned on opposite sides of the CPP stack.

Figure 15:
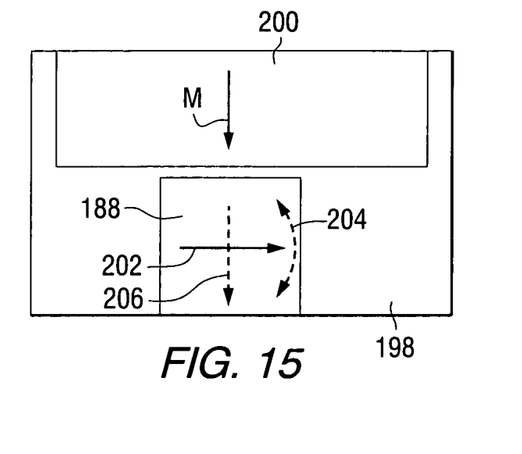
FIG. 15 is a top view of a sensor constructed in accordance with the invention.

FIG. 15 is a top view of the shielded three-layer multi-layer sensor of FIG. 14 biased from behind by a permanent magnet 200. FIG. 15 shows the orientation of the thin free layer magnetization 188 (solid arrow 202) and the thicker pinned layers (dashed arrow 206) when biased into the operating regime shown in FIGS. 9, 10, 11 and 12. Arrow 204 shows the movement of the magnetization of the free layer in response to an external magnetic field.

Figure 16:
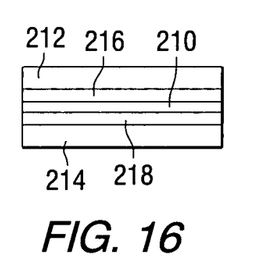
FIGS. 16, 17, 18 and 19 are side views of alternative CPP stacks.
Figure 17:
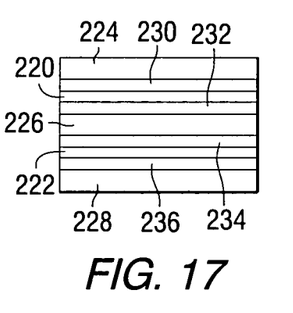
Figure 18:
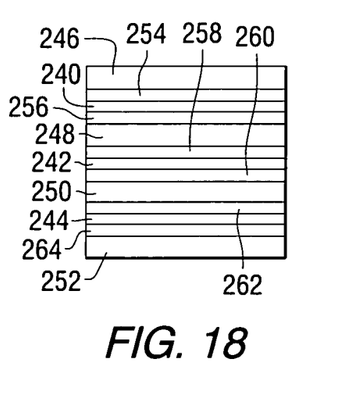

FIGS. 16, 17 and 18 show additional examples of CPP stacks that can be used in the invention. These examples have an increasing number of free magnetic layers. FIG. 16 shows a trilayer stack having a free layer 210 positioned between two higher moment layers 212 and 214 and separated from the higher moment layers by non-magnetic metallic layers 216 and 218.

FIG. 17 shows a multi-layer stack having free layers 220 and 222 and higher moment layers 224, 226 and 228. Non-magnetic metallic layers 230, 232, 234 and 236 separate the magnetic layers.

FIG. 18 shows a multi-layer stack having free layers 240, 242 and 244 and higher moment layers 246, 248, 250 and 252. Non-magnetic metallic layers 254, 256, 258, 260, 262 and 264 separate the magnetic layers.

FIGS. 14 and 15 show how a three-layer multi-layer can be incorporated into a shielded reader. The orientations of the magnetizations during operation are also shown. FIGS. 16, 17 and 18 show how the concept can be applied to multi-layers having more magnetic layers.

Figure 19:
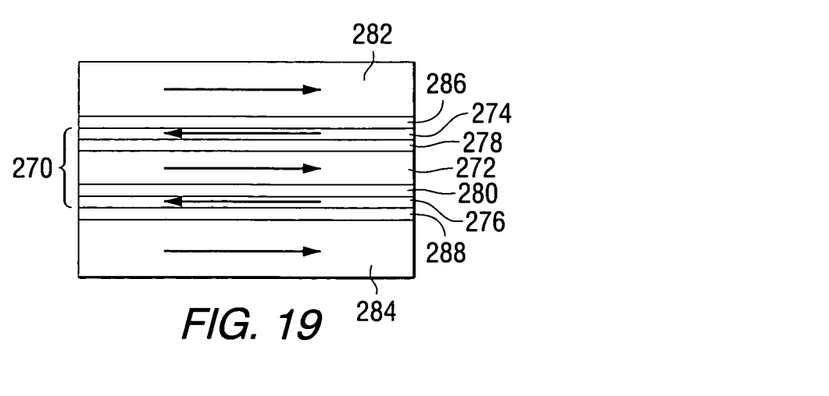

FIG. 19 shows an alternative way to reduce the effective net moment of the permeable layer by fabricating a three-layer synthetic antiferromagnet (SAF) where the magnetic layers are strongly coupled antiferromagnetically via RKKY interlayer coupling across a material such as Ru or Cr. In this case, the SAF still has a net magnetic moment so that it will respond to the fields from the media. The stack of FIG. 19 includes a SAF free layer 270 including a first magnetic layer 272 and two magnetic layers 274 and 276. Coupling layers 278 and 280 are structured to provide strong antiferromagnetic coupling between the first magnetic layer 272 and the two magnetic layers 274 and 276. Magnetic layers 282 and 284 are positioned on opposite sides of the SAF layer and separated from the SAF layer by non-magnetic layers 286 and 288. In FIG. 19, the free layer is made from a composite of three ferromagnetic layers that are strongly coupled antiferromagnetically. These three layers effectively act as a single magnetic layer. Otherwise, all other aspects of the device and its operation are the same as described previously. Layers 272, 274, and 276 are tightly coupled to each other in an antiparallel configuration. The entire composite structure acts like a "single" free ferromagnetic layer.

This invention uses a CPP stack in which the free magnetic layers have a net moment $M_s t$ that is less than that of the pinned layers. For a multi-layer structure where every magnetic layer is made of the same material, the free layers will be thinner than the pinned layers. However, the free layer can also be made out of a magnetic material having a lower $M_s$ than that of the pinned layers, which relaxes the constraint on the relative thickness ratio between permeable and pinned layers.

The ferromagnetic materials used in the CPP multi-layers can be anything that leads to large magnetoresistance. Typical materials include Ni, Co, Fe, and alloys of these materials.

The non-magnetic layers that separate adjacent ferromagnetic layers should be well matched to the ferromagnetic materials so that the device exhibits a large magnetoresistance. The materials should also lead to devices that are stable and reliable over time. Cu and Au are examples of two materials that work well.

The thicknesses of the ferromagnetic and non-magnetic layers within the CPP pillar can range from approximately 1 to 6 nm, although the invention is not restricted to these values.

CPP readers of this invention cancel out the spin transfer torques acting on the free magnetic layers of the device. This is accomplished using a structure of three magnetic layers separated by non-magnetic spacers, where the two outer magnetic layers are pinned and the middle magnetic layer is free. The spin torques from the two pinned layers oppose one another, thereby suppressing unwanted spin transfer induced magnetization dynamics, or noise, of the free layer. An application of this concept to a CPP multi-layer, including a magnetic layer of alternating magnetic moment, has been described. Numerical and experimental data reveal that layers with a large moment are effectively pinned by a magnetic field while the lower moment layers remain free.

While the invention has been described in terms of several embodiments, it will be apparent to those skilled in the art that various changes can be made to the described embodiments without departing from the scope of the invention as set forth in the following claims.

What is claimed is:

1. An apparatus, comprising:
    a ferromagnetic free layer having a first magnetic moment and having a magnetization that rotates in response to an external magnetic field;
    a first ferromagnetic reference layer positioned adjacent to a first side of the ferromagnetic free layer and having a second magnetic moment that is greater than the first magnetic moment of the free layer;
    a second ferromagnetic reference layer positioned adjacent to a second side of the magnetic free layer and having a third magnetic moment that is greater than the first magnetic moment of the free layer;
    a first non-magnetic spacer layer positioned between the ferromagnetic free layer and the first ferromagnetic reference layer;
    a second non-magnetic spacer layer positioned between the ferromagnetic free layer and the second ferromagnetic reference layer; and
    a source of magnetic field for biasing the first and second ferromagnetic reference layers, wherein the magnetizations of the first and second reference layers are aligned parallel to each other and along the same direction.

2. The apparatus of claim 1, wherein the ferromagnetic free layer has a thickness less than a thickness of the first and second ferromagnetic reference layers.

3. The apparatus of claim 1, wherein the ferromagnetic free layer has a saturation magnetization less than the saturation magnetization of the first and second ferromagnetic reference layer.

4. The apparatus of claim 1, wherein the ferromagnetic free layer is formed of at least one of nickel, cobalt, iron or alloys thereof.

5. The apparatus of claim 1, wherein the first ferromagnetic reference layer and the second ferromagnetic reference layer are formed of at least one of nickel, cobalt, iron or alloys thereof.

6. The apparatus of claim 1, wherein the first spacer layer and the second spacer layer are formed of at least one of copper, gold or alloys thereof.

7. The apparatus of claim 1, wherein a first spin momentum transfer torque from the first ferromagnetic reference layer opposes a second spin momentum transfer torque from the second ferromagnetic reference layer to reduce noise during a read back operation of an external magnetic field.

8. The apparatus of claim 1, wherein the free layer comprises a composite of three ferromagnetic layers that are coupled antiferromagnetically and collectively act as a single magnetic layer.

9. The apparatus of claim 1, wherein the thicknesses of the ferromagnetic layers and the spacer layers is in the range of 1 to 6 nm.

10. The apparatus of claim 1, wherein the magnetic field for biasing the first and second ferromagnetic reference layers is on the order of 1 kOe.

11. The apparatus of claim 1, further comprising:
one or more additional ferromagnetic free layers;
one or more additional ferromagnetic reference layers; and
one or more additional non-magnetic spacer layers positioned between the additional magnetic free layers and the additional magnetic reference layers.

12. A magnetoresistive element having reduced spin momentum transfer induced noise, the magnetoresistive element comprising:
a ferromagnetic free layer having a first magnetic moment and having a magnetization that rotates in response to an external magnetic field;
a first ferromagnetic reference layer positioned adjacent to a first side of the magnetic free layer and having a second magnetic moment that is greater than the first magnetic moment of the ferromagnetic free layer;
a second ferromagnetic reference layer positioned adjacent to a second side of the magnetic free layer and having a third magnetic moment that is greater than the first magnetic moment of the ferromagnetic free layer;
a first non-magnetic spacer layer positioned between the ferromagnetic free layer and the first ferromagnetic reference layer;
a second non-magnetic spacer layer positioned between the ferromagnetic free layer and the second magnetic reference layer; and
a source of magnetic field for biasing the first and second ferromagnetic reference layers, wherein the magnetizations of the first and second reference layers are aligned parallel to each other and along the same direction.

13. The magnetoresistive element of claim 12, wherein the ferromagnetic free layer has a thickness less than a thickness of the first magnetic reference layer.

14. The magnetoresistive element of claim 12, wherein the ferromagnetic free layer has a saturation magnetization less than the saturation magnetization of the first and second ferromagnetic reference layer.

15. The magnetoresistive element of claim 12, wherein a first spin momentum transfer torque of the first ferromagnetic reference layer opposes a second spin momentum transfer torque of the second ferromagnetic reference layer to reduce the noise during a read back operation of the external magnetic field.

16. The magnetoresistive element of claim 12, wherein the free layer comprises a composite of three ferromagnetic layers that are coupled antiferromagnetically and collectively act as a single magnetic layer.

17. A data storage system, comprising:
a storage media; and
a recording device positioned adjacent to the storage media wherein the recording device includes a read element, the read element comprising:
a ferromagnetic free layer having a first magnetic moment and having a magnetization that rotates in response to an external magnetic field;
a first ferromagnetic reference layer positioned adjacent to a first side of the ferromagnetic free layer and having a second magnetic moment that is greater than the first magnetic moment of the ferromagnetic free layer;
a second ferromagnetic reference layer positioned adjacent to a second side of the ferromagnetic free layer and having a third magnetic moment that is greater than the first magnetic moment of the ferromagnetic free layer;
a first non-magnetic spacer layer positioned between the ferromagnetic free layer and the first ferromagnetic reference layer;
a second non-magnetic spacer layer positioned between the ferromagnetic free layer and the second ferromagnetic reference layer; and
a source of magnetic field for biasing the first and second ferromagnetic reference layers, wherein the magnetizations of the first and second reference layers are aligned parallel to each other and along the same direction.

18. The system of claim 17, wherein the ferromagnetic free layer has a thickness less than a thickness of the first and second ferromagnetic reference layers.

19. The system of claim 17, wherein a first spin momentum transfer torque from the first ferromagnetic reference layer opposes a second spin transfer torque from the second ferromagnetic reference layer to reduce noise during a read back operation of an external magnetic field.

20. The system of claim 17, wherein the read element is a current-perpendicular-to-plane device.

* * * * *